US010096198B2

(12) United States Patent
Griswold et al.

(10) Patent No.: US 10,096,198 B2
(45) Date of Patent: Oct. 9, 2018

(54) ANONYMOUS BIOMETRIC PLAYER TRACKING

(75) Inventors: Chauncey W. Griswold, Reno, NV (US); Scott T. Gowin, Reno, NV (US); Steven G. Lemay, Reno, NV (US); Dwayne R. Nelson, Las Vegas, NV (US); Gregory A. Silva, Reno, NV (US)

(73) Assignee: IGT, Las Vegas, NV (US)

( * ) Notice: Subject to any disclaimer, the term of this patent is extended or adjusted under 35 U.S.C. 154(b) by 1496 days.

(21) Appl. No.: 13/306,911

(22) Filed: Nov. 29, 2011

(65) Prior Publication Data

US 2013/0137516 A1 May 30, 2013

(51) Int. Cl.
*G06F 17/00* (2006.01)
*G07F 17/32* (2006.01)

(52) U.S. Cl.
CPC ...... *G07F 17/3206* (2013.01); *G07F 17/3218* (2013.01); *G07F 17/3239* (2013.01)

(58) Field of Classification Search
None
See application file for complete search history.

(56) References Cited

U.S. PATENT DOCUMENTS

| | | | |
|---|---|---|---|
| 6,234,900 | B1 | 5/2001 | Cumbers |
| 6,676,522 | B2 | 1/2004 | Rowe et al. |
| 7,611,409 | B2 | 11/2009 | Muir et al. |
| 2002/0155887 | A1 | 10/2002 | Criss-Puszkiewicz et al. |
| 2007/0202941 | A1 | 8/2007 | Miltenberger et al. |
| 2008/0076572 | A1 | 3/2008 | Nguyen et al. |
| 2009/0098943 | A1 | 4/2009 | Weber et al. |
| 2009/0124376 | A1 | 5/2009 | Kelly et al. |
| 2009/0176566 | A1* | 7/2009 | Kelly .............................. 463/29 |

OTHER PUBLICATIONS

U.S. Appl. No. 13/156,903, filed Jun. 9, 2011.
U.S. Appl. No. 13/157,166, filed Jun. 9, 2011.
U.S. Appl. No. 13/217,105, filed Aug. 24, 2011.
U.S. Appl. No. 13/217,110, filed Aug. 24, 2011.
(Continued)

*Primary Examiner* — Paul A D'Agostino
(74) *Attorney, Agent, or Firm* — Neal, Gerber & Eisenberg LLP

(57) ABSTRACT

A processor-based gaming machine running wager-based games can include an exterior housing, a master gaming controller, a display device, and an anonymous player tracking device adapted to detect passively biometric information from players to facilitate the anonymous tracking of gaming activities without the use of traditional player tracking instruments. A player tracking system can include multiple such gaming machines, a database storing a plurality of player profiles that include biometric data, and a remote player tracking server configured to receive passively detected biometric data regarding anonymous players, determine whether the received biometric data is associated with existing player profiles, attribute credit for the anonymous gaming activity if it is, and create a new player profile if it is not. Player profiles can include multiple biometrics for each player, and confidence levels can be associated with a given biometric to a profile and a given gaming session to a profile.

17 Claims, 7 Drawing Sheets

(56) References Cited

OTHER PUBLICATIONS

U.S. Appl. No. 13/220,430, filed Aug. 29, 2011.
U.S. Appl. No. 13/333,659, filed Dec. 21, 2011.
U.S. Appl. No. 13/333,669, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,507, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/361,601, filed Jan. 30, 2012.
U.S. Appl. No. 13/335,613, filed Dec. 22, 2011.
U.S. Appl. No. 13/426,479, filed Mar. 21, 2011.
Australian Examination Report for Application No. 2012258430 dated Aug. 20, 2014 (6 pages).

* cited by examiner

ANONYMOUS BIOMETRIC PLAYER TRACKING

TECHNICAL FIELD

The present invention relates generally to gaming machines and systems, and more particularly to maintaining customer loyalty in a casino enterprise.

BACKGROUND

Developing and maintaining a loyal customer base is a critical component of operating a successful casino enterprise. To develop a loyal customer base, casino enterprises typically offer customers the chance to participate in a loyalty program that allows game play and possibly other customer activities to be tracked. In a traditional player loyalty program, a casino enterprise requires a player or customer to provide identification information before creating an account for the player or customer. The player identification information is stored to the player account, and can then be used to track the player through various gaming and non-gaming activities. Promotions and advertisements can then be sent to the player, such as via regular mail, electronic mail and/or any other identifying means provided by the player. A physical instrument, such as a magnetic striped card, is also typically provided to the player.

The card or other instrument can include an account number associated with the loyalty program account created for the player, and can be utilized during various activities within the casino enterprise so that a record of the player activities are generated and stored to an account associated with the instrument. As an example, a customer can insert a magnetic-striped player tracking card into a card reader associated with a slot machine, gaming table or other gaming device or venue to have a record of the player gaming activity on the slot machine stored to the account associated with the player tracking card. Based on the player activities, such as an amount wagered or amount spent elsewhere at the casino, the casino enterprise can offer the player or customer "comps" (i.e., complimentary offers), such as free or discounted services. In addition, the casino enterprise can mine and analyze the information gathered from the loyalty program, so as to better understand the demographics and behavioral patterns of their customers. This analysis can then be used to better tune their operating models, such as their mixture of services and comps that are provided, with the objective of increasing their profitability.

Unfortunately, many players do not wish to be part of a loyalty program for a casino. Such players may not want to go to the trouble of signing up for a loyalty program, or may simply desire not to provide certain aspects of their personal information to a given casino enterprise. One downside of this is that many opportunities to reward, incentivize, advertise and encourage further repeat business from anonymous and sometimes loyal players is often lost to the casino enterprise. While many designs and techniques used to provide player loyalty and tracking programs have generally worked well in the past, there is always a desire to provide further systems and methods to allow for anonymous player tracking even where players do not sign up for a formal player loyalty program.

SUMMARY

It is an advantage of the present invention to provide anonymous player tracking for players that do not sign up for a formal player loyalty program. This can be accomplished at least in part through the use of an anonymous player tracking system that detects and records biometric identifiers to stored profiles for anonymous players, and also tracks anonymous player activities according to such biometric identifiers when they are detected.

In various embodiments of the present invention, a processor-based gaming machine adapted for accepting a monetary wager, playing a game based on the wager and granting a payout based on the result of the wager-based game can be provided. The gaming machine can include an exterior housing arranged to contain a plurality of internal gaming machine components therein, a master gaming controller in communication with the internal gaming machine components and adapted to execute or control one or more aspects of the wager-based game, a display device in communication with the master gaming controller and adapted to present one or more aspects of the wager-based game thereupon, and an anonymous player tracking device in communication with the master gaming controller, a separate player tracking system or both. The anonymous player tracking device can be adapted to detect biometric information from a plurality of different players that utilize the gaming machine in order to facilitate the anonymous tracking of gaming activities without the use of player tracking instruments for the plurality of different players.

In various detailed embodiments, the anonymous player tracking device comprises a fingerprint tracking device, which can be implemented on a touch screen of the gaming machine, on one or more input buttons of the gaming machine, or both. The separate player tracking system can include a processor that is located remotely from the gaming machine. In addition, the player tracking system can be adapted to retain and use the detected biometric information upon subsequent separate interactions with at least some of the different players. The player tracking system can be further adapted to maintain individual profiles for each of the different players, and at least some of the individual profiles can include multiple different biometrics for the same player. Further, the player tracking system can be adapted to associate a newly detected and previously unknown biometric for a known player, and to update the individual profile for said known player to include the newly detected biometric. The player tracking system is preferably adapted to compare a detected biometric for a current gaming machine player with a plurality of stored biometrics, and is further adapted to associate the current player with a stored individual profile when the detected biometric matches a stored biometric on that stored individual profile. In some embodiments, the player tracking system is further adapted to determine a confidence level for said association based upon the strength of the match.

In additional embodiments, various methods of tracking players anonymously utilizing processor-based gaming machines adapted for running wager-based games are provided. Process steps can include maintaining a database of stored player profiles that include known player biometrics, detecting passively a first biometric for an anonymous player at one of a plurality of gaming machines, determining whether the first biometric is associated with an existing player profile stored on the database, tracking information regarding the gaming activity of the anonymous player at a gaming machine, and attributing credit for the gaming activity of the anonymous player to an existing player profile stored on the database when it is determined that the first biometric is associated with an existing player profile stored on the database. An additional process step can include creating a new player profile on the database when it is determined that the received biometric data is not associated with an existing player profile stored on the database. Further process steps can also include confirming that the anonymous player is associated with an existing player profile stored on the database, detecting passively a second biometric for the anonymous player at the plurality of gaming machines, determining that the second biometric is not stored on the existing player profile stored on the database for the anonymous player, and recording the second biometric to the existing player profile stored on the database for the anonymous player. In addition, the various methods can include assessing a confidence level for whether the first biometric is associated with an existing player profile, for whether a second detected biometric is associated with the existing player profile, or both.

In still further embodiments, a player tracking system adapted to facilitate the anonymous tracking of gaming players is provided. Such a player tracking system can include a plurality of gaming machines, such as those described above, a database storing a plurality of player profiles that include biometric data previously detected by the plurality of gaming machines, and a remote player tracking server that is in communication with the plurality of gaming machines and the database. The remote player tracking server can include a processor, a memory and a network interface, and the processor can be configured to perform the various process steps set forth above. In particular, the processor can be configured to receive passively detected biometric data regarding an anonymous player from one of the plurality of gaming machines, receive information regarding gaming activity of the anonymous player from said one of the plurality of gaming machines, determine whether the received biometric data is associated with an existing player profile stored on the database, and attribute credit for the gaming activity of the anonymous player to an existing player profile when it is determined that the received biometric data is associated with an existing player profile stored on the database. Similar to the foregoing, the processor can also be configured to create a new player profile on the database when it is determined that the received biometric data is not associated with an existing player profile stored on the database. At least some of said player profiles can include multiple different biometrics for the same player. Also similar to the foregoing, the processor can be further configured to associate a newly detected and previously unknown biometric for a known player and to update the player profile for the known player to include said newly detected biometric.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for anonymous player tracking. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to anonymous player tracking, such as on an electronic gaming machine ("EGM"), system or network. Electronic gaming machines or devices for use with the present invention can be, for example, any of the processor based gaming machines provided by IGT of Reno, Nev., or any other gaming machine or system provider. Although the subject gaming machines and systems can be adapted to provide a wager based game of chance by displaying video data that simulates a mechanical reel, it will be readily appreciated that the various embodiments of the present invention disclosed herein can also be used with gaming machines that provide or simulate wheels, cards, bingo items, keno items, racing icons, sporting icons and a wide variety of other gaming items. Further, the present invention can also be used in some instances in conjunction with other machines and items that are not limited to processor based or wager based games. For example, purely mechanical gaming machines or gaming machines adapted to provide games that are not wager based can also be used.

Gaming Machines and Systems

Figure 1:
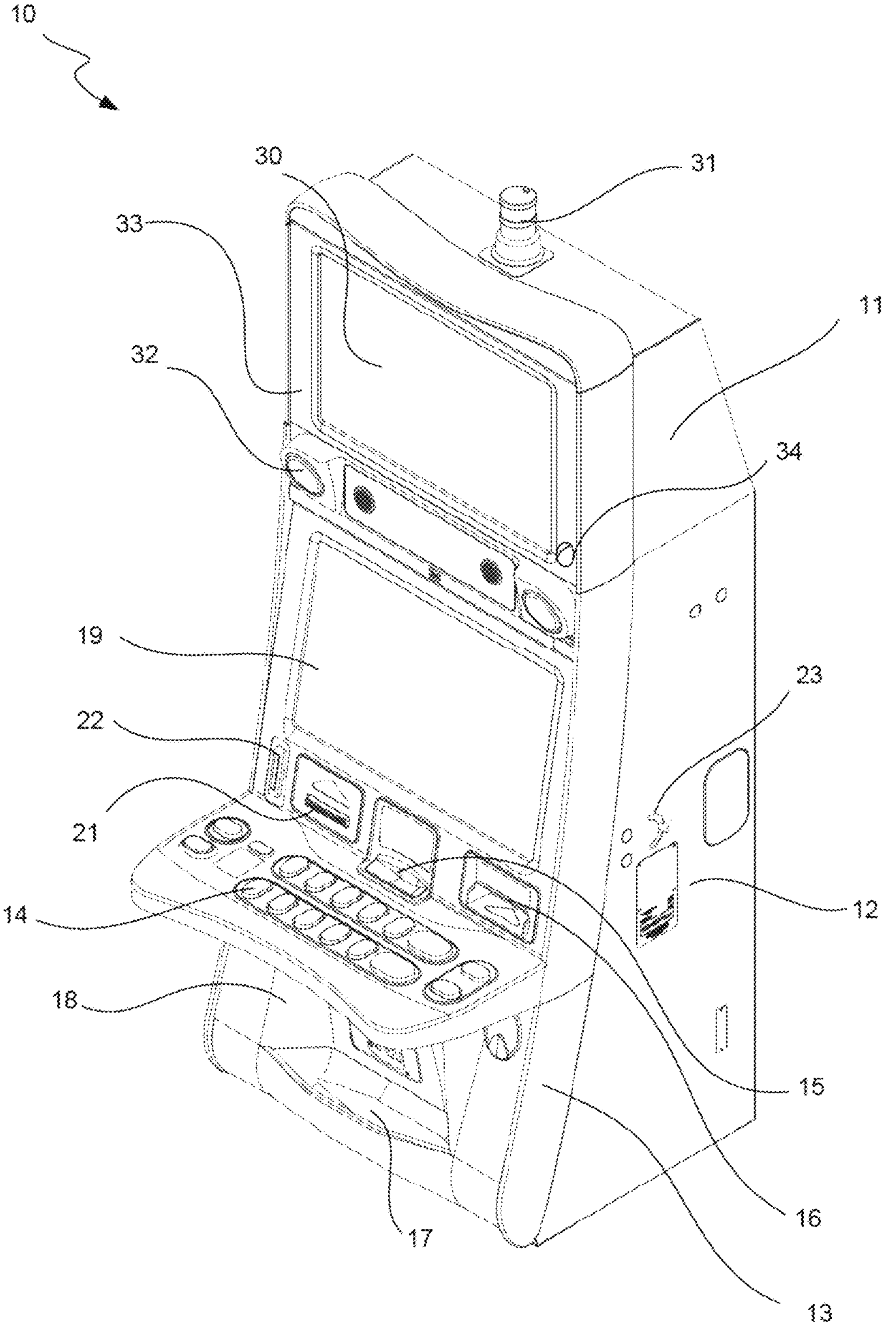
FIG. 1 illustrates in front perspective view an exemplary gaming machine.

Referring first to FIG. 1, one example of a processor based gaming machine in is shown in front perspective view. Gaming machine 10 is one example of what can be considered a "thick-client" device. Typically, a thick-client device is configurable to communicate with one or more remote servers, but provides game play independent of the remote servers. Such independent game play can include game outcome determination, for example. In addition, a thick-client device can be considered as such because it includes cash handling capabilities, such as peripheral devices for receiving cash, and a secure enclosure within the device for storing the received cash. In contrast, a thin-client device, such as a mobile gaming device, may be more dependent on a remote server to provide a component of the game play on the device, such as game outcome determination, and/or may not include peripheral devices for receiving and securely storing cash.

Many different configurations are possible between thick and thin clients. For instance, a thick-client device, such as gaming machine 10, deployed in a central determination configuration, may receive game outcomes from a remote server but still provide cash handling capabilities. Further, the peripheral devices can vary from gaming device to gaming device. For instance, gaming machine 10 can be configured with electro-mechanical reels to display a game outcome instead of a video display. Thus, the various features and peripherals of gaming machine 10 are described for the purposes of illustration only, and are not meant to be limiting. One of skill in the art will readily appreciate numerous other peripherals and differences not set forth herein.

As shown, gaming machine 10 can include a top box 11 and a main cabinet 12, which defines an interior region of the gaming machine. The cabinet includes one or more rigid materials to separate the machine interior from the external environment, is adapted to house a plurality of gaming machine components within or about the machine interior, and generally forms the outer appearance of the gaming machine. Main cabinet 12 includes a main door 13 on the front of the machine, which opens to provide access to the interior of the machine. The interior may include any number of internal compartments, such as for cooling and security purposes, among others. Attached to the main door or cabinet are typically one or more player-input switches or buttons 14; one or more money or credit acceptors, such as a coin acceptor 15, and a bill or ticket scanner and acceptor 16; a coin tray 17; and a belly glass 18. Viewable through main door 13 is a primary display monitor 19.

Top box 11, which typically rests atop of the main cabinet 12, may also contain one or more secondary or additional displays 30, a candle 31, one or more speakers 32, a top glass 33 and a camera 34, among other items. Various further gaming machine items can be located on the top box and/or main cabinet. For example, main cabinet 12 may also include a ticket printer 21, a card reader 22, and a locking mechanism 23 for main door 13, among other items. One or more of these components can be used to form a player tracking device, as will be readily appreciated. For example, card reader 22 can be part of a player tracking device that is integrated within the machine. One or more additional player tracking displays (not shown) may also be used in conjunction with these and/or other components. Further components and combinations are also possible, as is the ability of the top box to contain one or more items traditionally reserved for main cabinet locations, and vice versa. For example, the ticket printer or various integrated player tracking components may be located on the top box for some gaming machines.

It will be readily understood that gaming machine 10 can be adapted for presenting and playing any of a number of games and gaming events, particularly games of chance involving a player wager and potential monetary payout, such as, for example, a digital slot machine game and/or any other video reel game, among others. While gaming machine 10 is usually adapted for live game play with a physically present player, it is also contemplated that such a gaming machine may also be adapted for remote game play with a player at a remote gaming terminal. Such an adaptation preferably involves communication from the gaming machine to at least one outside location, such as a remote gaming terminal itself, as well as the incorporation of a gaming network that is capable of supporting a system of remote gaming with multiple gaming machines and/or multiple remote gaming terminals.

Gaming machine 10 may also be a "dummy" machine, kiosk or other "thin" gaming terminal, in that all processing may be done at a remote server, with only the external housing, displays, and pertinent inputs and outputs being available to a player. Further, it is also worth noting that the term "gaming machine" may also refer to a wide variety of gaming machines in addition to traditional free standing gaming machines. Such other gaming machines can include kiosks, set-top boxes for use with televisions in hotel rooms and elsewhere, and many server based systems that permit players to log in and play remotely, such as at a personal computer, personal digital assistant, cellular telephone or tablet computer, among other possible devices. All such gaming machines can be considered "gaming machines" for embodiments described herein.

Figure 2:
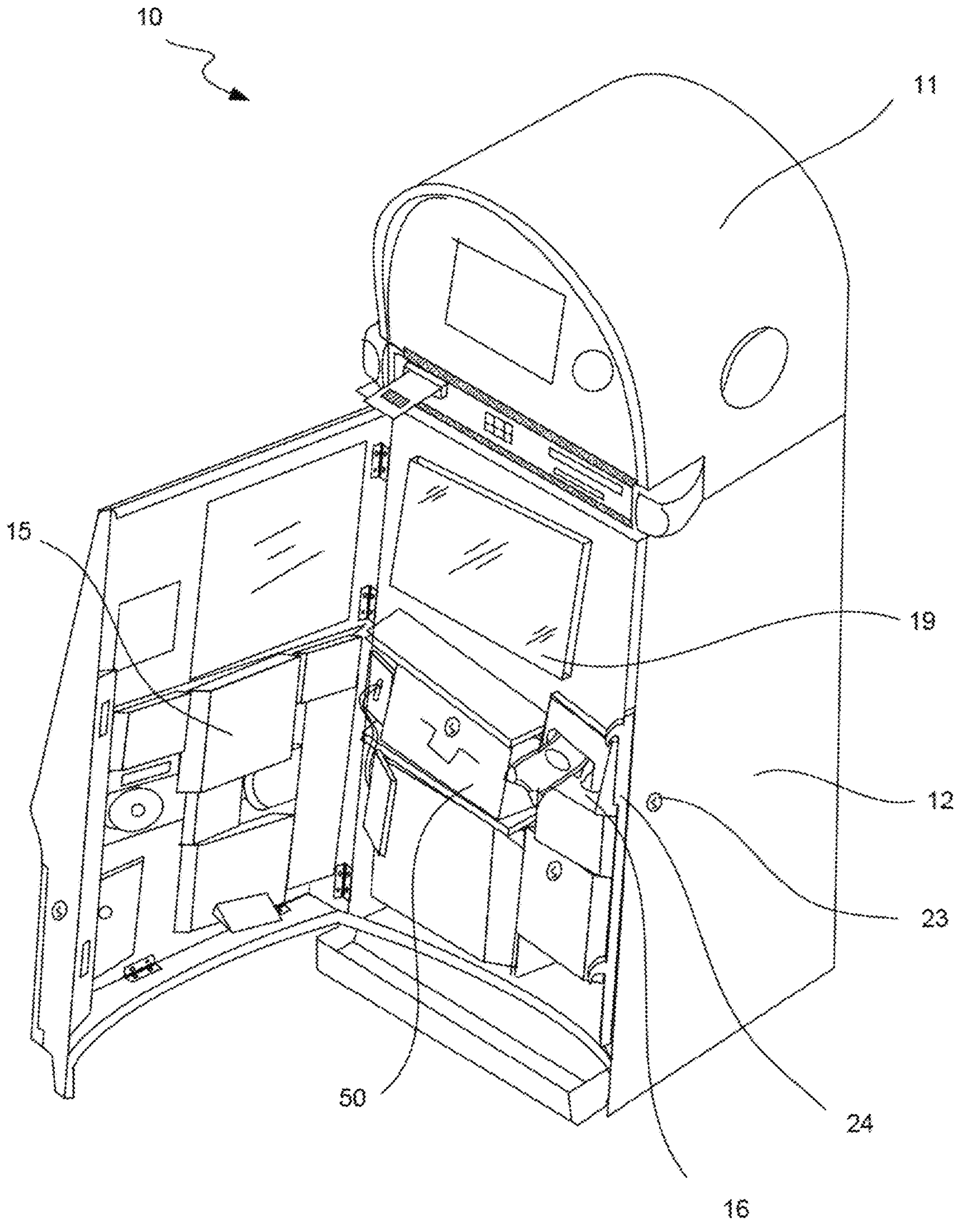
FIG. 2 illustrates in front perspective view an exemplary gaming machine with its main door opened.

Continuing with FIG. 2, an exemplary gaming machine is illustrated in front perspective view with its main door opened. In additional to the various exterior items described above, such as top box 11, main cabinet 12 and primary display 19, gaming machine 10 also comprises a variety of internal components. As will be readily understood by those skilled in the art, gaming machine 10 can include a variety of locks and mechanisms, such as main door lock 23 and an associated latch 24. Internal portions of coin acceptor 15 and bill or ticket scanner 16 can also be seen, along with the physical meters associated with these peripheral devices. Processing system 50 can include gaming machine computer architecture, which can be secured away within a restricted region inside the gaming machine, as will be readily appreciated.

When a person wishes to play a gaming machine 10, he or she provides coins, cash, tickets or a credit device to a scanner included in the gaming machine. The scanner may comprise a bill scanner or a similar device configured to read printed information on a credit device such as a paper ticket or magnetic scanner that reads information from a plastic card. The credit device may be stored in the interior of the gaming machine. During interaction with the gaming machine, the person views game information using a display. Usually, during the course of a game, a player is required to make a number of decisions that affect the outcome of the game. The player makes these choices using a set of player-input switches. A game ends with the gaming machine providing an outcome to the person, typically using one or more of the displays.

After the player has completed interaction with the gaming machine, the player may receive a portable credit device from the machine that includes any credit resulting from interaction with the gaming machine. By way of example, the portable credit device may be a ticket having a dollar or other monetary value produced by a printer within the gaming machine. A record of the credit value of the device may be stored in a memory device provided on a gaming machine network (e.g., a memory device associated with validation terminal and/or processing system in the network). Any credit on some devices may be used for further games on other networked gaming machines 10. Alternatively, the player may redeem the device at a designated cashier, change booth or pay machine.

Gaming machine 10 can be used to play any primary game, bonus game, progressive or other type of game. Other wagering games can enable a player to cause different events to occur based upon how hard the player pushes on a touch screen. Gaming machine 10 can also enable a player to view information and graphics generated on one display screen while playing a game that is generated on another display screen. Such information and graphics can include game paytables, game-related information, entertaining graphics, background, history or game theme-related information, or information not related to the game, such as advertisements. The gaming machine can display this information and graphics adjacent to a game, underneath or behind a game or on top of a game. For example, a gaming machine could display paylines on a proximate display screen and also display a reel game on a distal display screen, and the paylines could fade in and fade out periodically.

Figure 3:
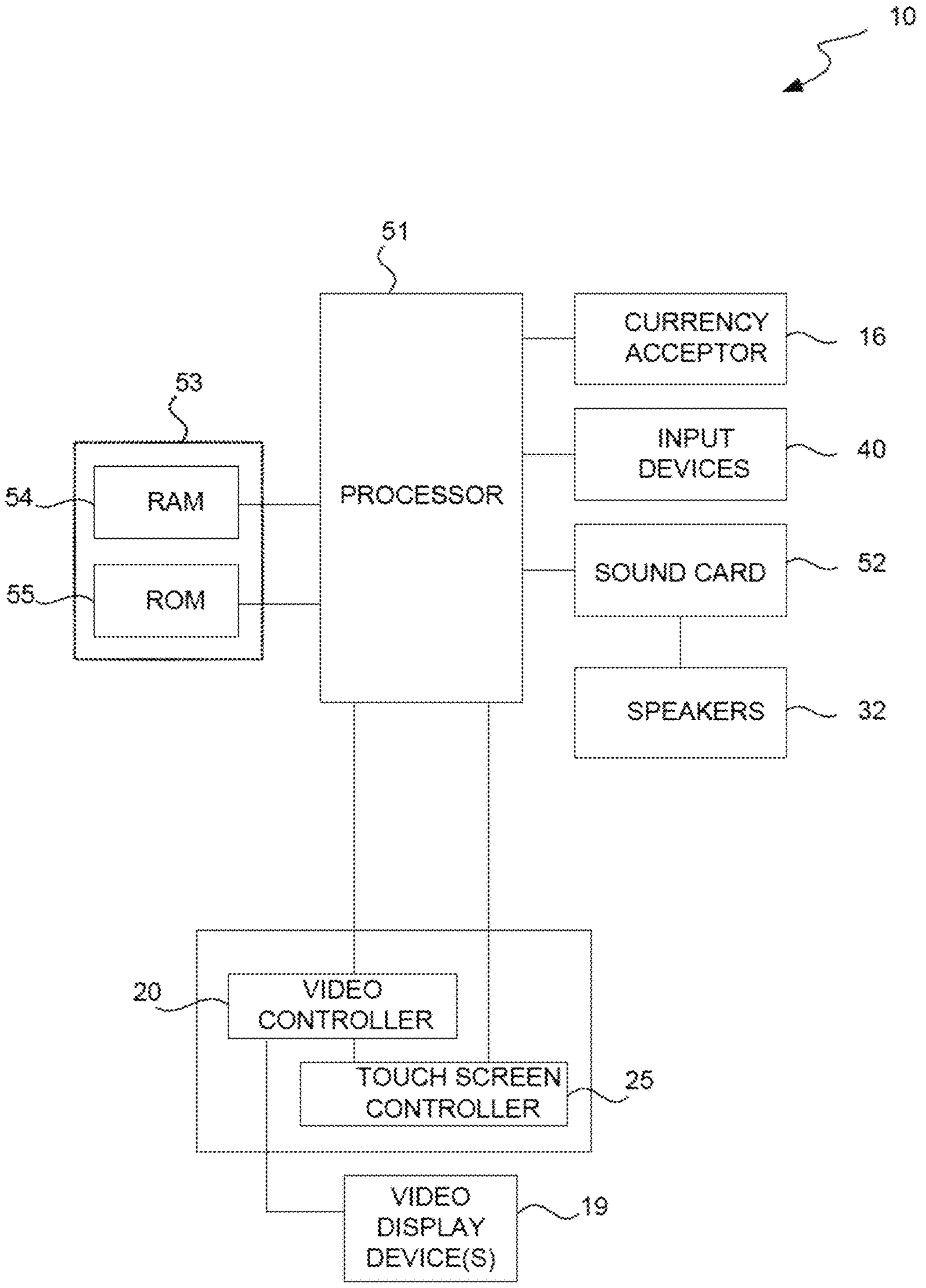
FIG. 3 illustrates in block diagram format an exemplary control configuration for use in a processor based gaming machine.

An electronic gaming machine can also include one or more processors and memory or other storage components that cooperate to output games and gaming interaction functions from stored memory. To this extent, FIG. 3 illustrates a block diagram of an exemplary control configuration for use in a processor based gaming machine 10. Primary processor or processing system 51 can be a microprocessor or microcontroller-based platform that includes one or more commercially available microprocessors provided by a variety of vendors known to those of skill in the art. Processor or processing system 51 can be a master gaming controller ("MGC") that is responsible for game determination and monetary accounting functions, among various other gaming machine functions. MGC 51 is preferably in communication with and capable of causing a display device 19 to output data such as symbols, cards, images of people, characters, places, and objects which function in the gaming device. Display device 20 can be associated with a video controller 19 dedicated to the display and that communicates with processor 51. A touch screen controller 25 adapted to accept input from a touch screen associated with display 19 can also be in communication with processor 51 and video controller 20.

Gaming machine 10 may also include one or more application-specific integrated circuits ("ASICs") or other hardwired devices. One or more dedicated memory or storage components 53 may include one or more memory modules, flash memory or another type of conventional memory that stores executable programs that are used by the processing system to control various gaming machine components. Memory 53 can include any suitable software and/or hardware structure for storing data, including a tape, CD-ROM, floppy disk, hard disk or any other optical or magnetic storage media. Memory 53 may also include a) random access memory ("RAM") 54 for storing event data or other data generated or used during a particular game and b) read only memory ("ROM") 55 for storing program code that controls functions on the gaming machine such as playing a game. Although the processor 51 and memory devices 53 can reside the gaming machine itself 10, it is possible to provide some or all of their functions at a central location such as a network server for communication to a playing station such as over a local area network ("LAN"), wide area network ("WAN"), Internet connection, microwave link, and the like.

In various embodiments, a player can use one or more input devices 40, such as a pull arm, play button, bet button or cash out button to input signals into the gaming machine 10. One or more of these functions could also be employed on a touch screen. In such embodiments, the gaming machine 10 can include a touch screen controller 25 that communicates with a video controller 20 or processor 51. A player can input signals into the gaming machine by touching the appropriate locations on the touch screen. Processor 51 also communicates with and/or controls other elements of gaming machine 10. For example, this includes providing audio data to sound card 52, which then provides audio signals to speakers 32 for audio output. Various commercially available sound cards and speakers are suitable for use with gaming machine 10. Processor 51 can also be connected to a currency acceptor 16 such as the coin slot or bill acceptor. Processor 51 can operate instructions that require a player to deposit a certain amount of money in order to start the game.

Although the processing system shown in FIG. 3 is one specific processing system, it is by no means the only processing system architecture on which embodiments described herein can be implemented. Regardless of the processing system configuration, it may employ one or more memories or memory modules configured to store program instructions for gaming machine network operations and operations associated with layered display systems described herein. Such memory or memories may also be configured to store player interactions, player interaction information, and other instructions related to steps described herein, instructions for one or more games played on the gaming machine, and so forth.

Because such information and program instructions may be employed to implement the systems/methods described herein, the present invention relates to machine-readable media that include program instructions, state information, and the like for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher-level code that may be executed by the computer using an interpreter.

The processing system may offer any type of primary game, bonus round game or other game. In one embodiment, a gaming machine permits a player to play two or more games on two or more display screens at the same time or at different times. For example, a player can play two related games on two display screens simultaneously. In another example, once a player deposits currency to initiate the gaming device, the gaming machine allows a person to choose from one or more games to play on different display screens. In yet another example, the gaming device can include a multi-level bonus scheme that allows a player to advance to different bonus rounds that are displayed and played on different display screens.

In various embodiments, gaming machine 10 can utilize a "state" machine architecture. In such a "state" machine architecture, critical information in each state is identified and queued for storage to a persistent memory. The architecture does not advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming machine or device. Examples of critical information can include, but are not limited to, an outcome determined for a wager-based game, a wager amount made on the wager-based game, an award amount associated with the outcome, credits available on the gaming device, and a deposit of credits to the gaming device.

In various embodiments, gaming machine 10 can also include one or more secondary controllers (not shown). Such secondary controllers can be associated with various peripheral devices coupled to the gaming machine, such as value input devices and value output devices. As another example, one or more of such secondary controllers can be associated with peripheral devices, such as input devices, video displays, electro-mechanical displays, and a player tracking unit, among other possibilities. In some embodiments, a secondary controller can receive instructions and/or data from and provide responses to the MGC or primary processor 51. The secondary controller can be configured to interpret the instructions and/or data from the MGC, and also to control a particular device according to the received instructions and/or data. Additional such controllers may also be possible.

In some embodiments, a secondary controller can be used to control a number of peripheral devices independently of primary processor 51. For instance, a player tracking unit can include one or more of a video display, a touch screen, card reader, network interface, input buttons and the like. A player tracking controller can serve as a secondary controller to control these devices, such as to provide player tracking services and bonusing on gaming machine 10. Alternatively, the primary processor 51 can control these devices to perform player tracking functions. An advantage of performing player tracking functions via a secondary controller, such as a player tracking controller, is software on the player tracking unit can be developed and modified via a less lengthy and regulatory intensive process than is required for software executed by the primary processor 51. In general, certain functions of the gaming machine that are not subject to as much regulatory scrutiny as the primary wager-based game play functions can be decoupled from the primary processor 51 and implemented on a secondary controller instead. An advantage of this approach, such as for a player tracking controller, is that software approval process for the software executed by the secondary controller can be relatively less intensive.

Figure 4:
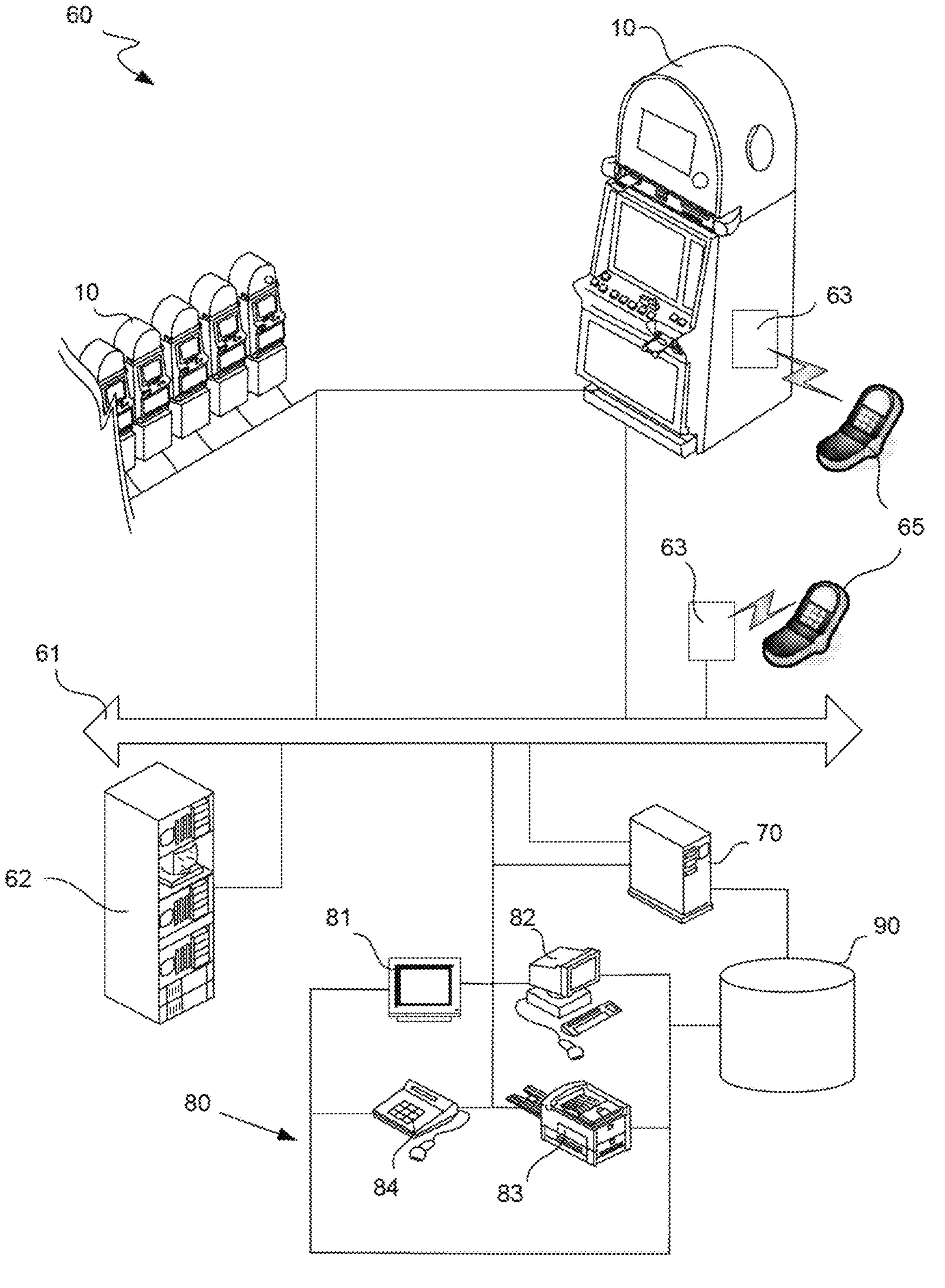
FIG. 4 illustrates in block diagram format an exemplary network infrastructure for providing a gaming system having one or more gaming machines.

Continuing with FIG. 4, an exemplary network infrastructure for providing a gaming system having one or more gaming machines is illustrated in block diagram format. Exemplary gaming system 60 has one or more gaming machines, various communication items, and a number of host-side components and devices adapted for use within a gaming environment. As shown, one or more gaming machines 10 adapted for use in gaming system 60 can be in a plurality of locations, such as in banks on a casino floor or standing alone at a smaller non-gaming establishment, as desired. A common bus 61 can connect one or more gaming machines or devices to a number of networked devices on the gaming system 60, such as, for example, a general-purpose server 62, one or more special-purpose servers 70, a sub-network of peripheral devices 80, and/or a database 90. Additional system devices (not shown) can include table gaming devices associated with table games where a live operator or a virtual operator is employed, and also mobile gaming devices, which may be owned by the gaming establishment and/or players themselves. The network can include wired, wireless or a combination of wired and wireless communication connections and associated communication routers.

In some embodiments, a mobile device interface 63 can be provided for communicating with a mobile device 65, such as a pager, PDA, cell phone, tablet computer or other wireless communications device carried by players or casino personnel. Such a mobile device interface 63 can be on a gaming machine 10, and/or may located elsewhere about the gaming floor. A wireless communication protocol, such as Bluetooth™ and a Wi-Fi compatible standard, can be used for communicating with various mobile devices 63 via mobile device interfaces 65. Alternatively, or in addition, the mobile device interface can implement a short range communication protocol, such as a near-field communication ("NFC") protocol used for mobile wallet applications. NFC is typically used for communication distances of 4 cm or less. In addition, a wired communication interface, such as a docking station, can be integrated into the gaming machine. Such a wired communication interface can be configured to provide communications between the gaming machine 10 and the mobile device 65, and/or may provide power to the mobile device, such as to recharge a battery in the mobile device.

A general-purpose server 62 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 60 contains one or more special-purpose servers 70 that can be used for various functions relating to the provision of anonymous player tracking systems and methods, such as those set forth in greater detail below. Such a special-purpose server or servers 70 could have one or more processors, storage units, network interfaces and specifically adapted software thereon, and may include, for example, a cashless gaming server, a player verification server, a player tracking server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 60 can be isolated from any other network at the establishment, such that a general-purpose server 62 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 70 or another similar component within a general-purpose server 62 also preferably includes a connection to a database or other suitable storage medium 90. Database 90 is preferably adapted to store many or all files containing pertinent data or information for a particular purpose, such as, for example, data regarding anonymous player profiles and tracking, among other potential items. Files, data and other information on database 90 can be stored for backup purposes, and are preferably accessible at one or more system locations, such as at a general-purpose server 62, a special purpose server 70 and/or a cashier station or other sub-network location 80, as desired.

While gaming system 60 can be a system that is specially designed and created new for use in a casino or gaming establishment, it is also possible that many items in this system can be taken or adopted from an existing gaming system. For example, gaming system 60 could represent an existing cashless gaming system or player tracking system, to which one or more of the inventive components or controller arrangements are added, such as controllers, storage media, and/or other components that may be associated with a dynamic display system adapted for use across multiple gaming machines and devices. In addition to new hardware, new functionality via new software, modules, updates or otherwise can be provided to an existing database 90, specialized server 70 and/or general-purpose server 62, as desired. Other modifications to an existing system may also be necessary, as might be readily appreciated.

Anonymous Player Tracking

As noted above, the ability of a casino enterprise to track player activities can be beneficial on several levels. Being able to know individual player tendencies results in the ability to market to individual players more effectively, while also offering appropriate levels of comps to the more active and loyal players of a given casino enterprise. For example, while a complimentary hotel room or fine meal at a given casino resort may be appropriate for a high roller that wagers thousands of dollars per gaming session, such comps would not be cost effective for players that only play penny slots for a short period of time. While traditional systems that employ the use of magnetic stripe player tracking cards, tokens, devices or the like are well known, alternative systems that allow for the tracking of anonymous players that choose not to use such cards or devices are also desirable.

For purposes of discussion herein, the term "anonymous player" generally refers to a customer of a casino enterprise that at least temporarily engages in gaming or other activities without the use of a player tracking card or other means that allows the establishment to readily associate the player customer activities with a registered player account. Of course, even players that regularly use their player tracking cards, have and occasionally use such cards, or are at least registered in a player tracking system can sometimes be considered "anonymous players," such as where a player forgets to use his or her player tracking card for a particular gaming session.

The anonymous player tracking systems disclosed herein can include, for example, various biometric detecting devices that are able to detect passively individualized biometrics for anonymously playing customers. Passive detection of player biometrics generally includes detection that does not involve any affirmative activity by the player. Thus, while the affirmative use of a fingerprint detector typically involves an instruction to a person to place his or her finger in a selected location so that a fingerprint can be read, a passive detection is one that is made during the routine activity of the person. Such passive detection may take place without the knowledge of the person being detected. For example, a player may press a gaming machine button to play a game, where the pressed button has a built-in fingerprint reader that detects the player fingerprint.

Such passively read or detected fingerprints can be compared against a database of known fingerprints to identify an anonymous player that has declined to use a formally issued player tracking card for game play on an EGM. In this regard, the main display and/or input buttons on the EGM can be equipped as passive fingerprint readers or detectors. For example, some LCD input displays allow a display screen to scan input or capture images directly into the screen. In addition to the ability to display images as in any normal LCD, such input displays include a data input function that enables them to capture images directly via sensors within a thin film photosensitive transistor layer built into the screen itself.

Such an input display function is different from a camera, in that it inputs actual size images directly from the built-in image sensors, which are typically incorporated at the pixel level. For example, there can be one image sensor for every RGB pixel in the LCD display. Alternatively, other sensor to RGB pixel ratios can be used, such as 1-2, 2-1, 3-1 and so forth, as desired for various input and redisplay resolution applications. In addition to being able to read fingerprints, this technology can be used in many other ways, such as, for example, to capture data from a catalog, to read barcodes, other printed materials or the like. Examples of such devices have been developed by Sharp Corporation of Osaka, Japan, and also by Toshiba Matsushita Display Technology Co., Ltd. of Tokyo, Japan ("TMD"). TMD has exhibited and provided demonstrations of such a device, which included a display resolution of 320 pixels by 240 pixels and also a scanner resolution of 960 pixels by 240 pixels. It is expected that finer resolutions and larger LCD panels will eventually become available using the same or similar techniques as for these prototypes.

In alternative embodiments, or in addition to the foregoing, one or more input buttons on the gaming machine can be similarly adapted as fingerprint tracking devices. Such buttons can include video or visual displays thereon, or can simply be equipped to read the fingerprints of players pressing the buttons. In some embodiments, multiple input buttons can be equipped with such passive fingerprint tracking devices. This can be done in combination with a fingerprint tracking touch screen for the main display of an EGM.

In addition, or as an alternative, to using an input display and/or input buttons for passive fingerprint detection, a separate input panel can similarly be used. Such a separate input panel could be a touch input panel that is larger than a typical input button but smaller than a primary display on an EGM. Such an input panel can be adapted to have multiple virtual buttons or touch regions, and may include an overlay or a built in LCD, LED or other display behind a relatively small touch screen. The size of such a separate input panel can generally range from that of a touch face for a cellular telephone to that of a touch face for a tablet device, although smaller and larger sizes are also certainly possible.

In still further embodiments, other player biometrics can be passively measured. Passive detection of such player biometrics can include retinal scans, vein detection in palms or other body components, facial recognition, voice recognition, handwriting analysis, keyboard or other input styles and tendencies, eye pattern movements, shapes of fingers, hands or other body parts, thermal patterns, blood pressure and the like. Various suitable hardware devices and specialized software can be used for such alternative passive biometric tracking, such as cameras, microphones, associated software, and the like.

Figure 5:
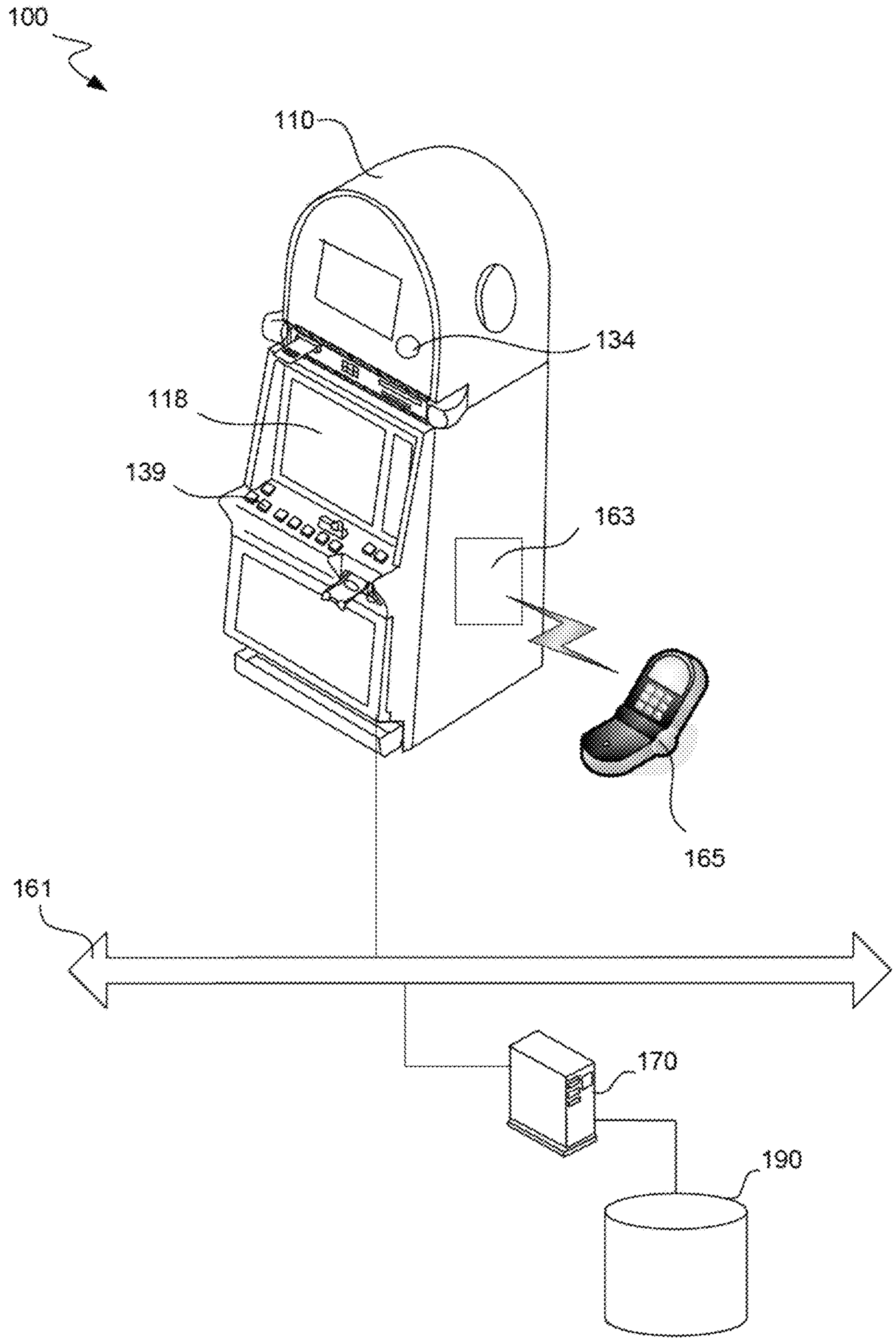
FIG. 5 illustrates in block diagram format an exemplary specialized gaming system adapted for anonymous player tracking according to one embodiment of the present invention.

Turning now to FIG. 5, an exemplary specialized gaming system adapted for anonymous player tracking according to one embodiment of the present invention is shown in block diagram format. Exemplary specialized gaming system 100 can be similar to gaming system 60 above, with a few key differences. Also, it will be understood that various components from gaming system 60 above may still be present in gaming system 100, although such components are not shown again in FIG. 5 simply for purposes of focus and discussion. Gaming system 100 can include a specialized gaming machine 110 that is adapted for anonymous player tracking. Such a specialized gaming machine 110 can include an input display touch screen 118 that is adapted to provide a primary display, a touch screen input function to players, and a fingerprint detection of players that touch the screen. Similarly, one or more input buttons 139 can be adapted to accept a player input, and also to detect a fingerprint of a player that presses the button. A static or video display may also be presented on the button or buttons 139, as may be desired.

In addition, one or more cameras 134 can be adapted to detect not only the presence of an active player at the specialized EGM 110, but also for retinal scanning, facial recognition, and/or eye pattern movements, all of which are additional biometrics that can be detected passively to track players anonymously. Still further, one or more microphones (not shown) or styluses for handwriting inputs (not shown) can also be implemented on gaming machine 110 so as to detect passively other forms of anonymous player biometrics. It will be readily appreciated that not all of these different types of biometrics and biometric tracking means need to be used at a given EGM or device, and that any such EGM or device can employ any such biometric tracking means individually or in any combination with other such means. For example, while the depicted EGM 110 shows such means in the form of a fingerprint detecting input display touch screen 118, fingerprint detecting input buttons 139, and a specialized camera 134 adapted for facial recognition and/or eye pattern movement, such an EGM need only employ one of these measures, such as a single button 139 adapted to detect fingerprints.

As yet another way to track players anonymously, specialized gaming system 100 may also be adapted to detect, identify and associate wireless mobile devices associated with anonymous players. For example, a player having an anonymous or unregistered gaming session at gaming machine 110 may have a PDA, cell phone or other mobile device 165 on or near his or her person while he or she plays. A mobile device interface 163 on gaming machine 110 can be adapted to detect the presence of and even identify the mobile device 165 of the player even where communications between the gaming machine and mobile device have not been affirmatively initiated. Again, such mobile device interfaces 165 may also be located elsewhere about the gaming floor, in addition to on EGMs themselves.

As will be readily appreciated, many wireless mobile devices have unique identifiers (e.g., a MAC address) or at least some form of identifier (e.g., make and model of Bluetooth™ headphones) that distinguishes the device from most other wireless mobile devices. Such identifiers can typically be read anonymously or "passively" by other wireless devices without any input from or indication to the owner or user of the wireless mobile device being read and identified. As such, the presence of a wireless mobile device on an anonymous player can be considered a pseudo "biometric," at least with respect to identifying passively that particular anonymous player. In such cases where a wireless mobile device 165 can be read and associated with a particular anonymous player, such information can be included with other information in a database regarding that player, with such other information possibly including other actual biometric identifiers for the player, as well as player gaming history, levels, comp histories, and the like.

In some embodiments, the wireless mobile device 165 of a player might also be used to detect or track actual biometric data and pass this information along to a nearby EGM or other system device as well. For example, some mobile devices may be adapted to detect fingerprints on a touch face thereof or to perform voice recognition at a microphone thereof. Other types of biometric information might also be detected by the separate mobile device. Such biometric data could then be transmitted in certain circumstances and acted upon by the system.

In addition to specialized gaming machine 110, the anonymous player tracking system 100 can also include a common bus 161 or other suitable communication means to connect one or more gaming machines or devices to a number of networked devices on the system. Such networked devices can include one or more special-purpose servers 170 and one or more databases 190 that are both adapted to facilitate anonymous player tracking. Again, such special-purpose server(s) could have one or more processors, storage units, network interfaces and specifically adapted software thereon that facilitate the administration of anonymous player tracking. In general, specialized EGMs 110, other devices on the casino floor (not shown), backroom server(s) 170 and/or database(s) 190 can have hardware and software that are adapted for use with an anonymous player tracking system. Such hardware and software components can be adapted to read a biometric and compare it against a database of known and stored biometrics. If there is a match, then the EGM or system can determine that the anonymous player is still present and conducting activities on a given EGM or at another pertinent location.

In some embodiments that deal with fingerprint data, the EGM or system can be adapted to analyze each fingerprint read to determine if a plurality of fingerprints are all associated with a single person, or with multiple different players. As will be readily appreciated, most players will have ten different fingerprints. As such, a profile for a player can include up to ten different fingerprints for that player profile. Known fingerprints or other biometrics can be updated to include newly detected biometrics. In this manner, a single anonymous player can be associated with multiple biometric readings, rather than have each new fingerprint from the same player erroneously stand for a new anonymous player. As such, individual player tracking profiles for numerous different players can be maintained at database 190. Such player tracking profiles can be for both identified and registered (i.e., carded) players, as well as for anonymous players for which the gaming establishment has no identifying or personal information other than read biometrics.

Figure 6:
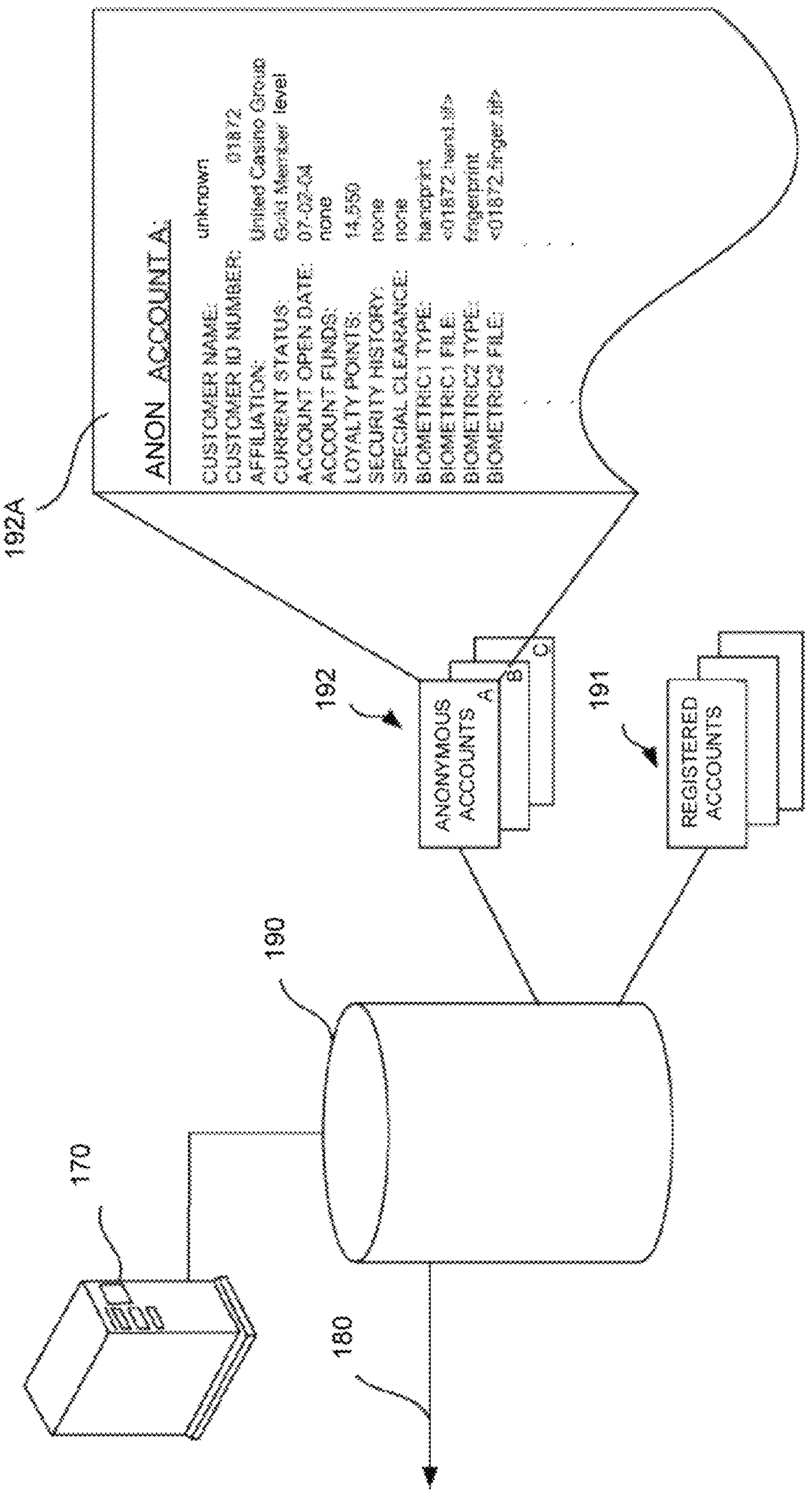
FIG. 6 illustrates in block diagram format an exemplary anonymous player tracking profile according to one embodiment of the present invention.

Turning now to FIG. 6, an exemplary anonymous player tracking profile according to one embodiment of the present invention is disclosed. Again, a special purpose server 170 adapted for anonymous player tracking can be coupled to a specialized player tracking database 190. This database 190 can hold a plurality of regular registered player accounts 191 in addition to a plurality of anonymous player profiles or accounts 192. Such player accounts can be separated or otherwise designated as registered and anonymous accounts, or may not be so separated, as may be desired. In either circumstance, the player accounts can be similar for both registered and anonymous players. That is, registered player accounts may also contain biometric information for registered players, such as where an establishment desires to credit uncarded or otherwise anonymous gaming sessions to the appropriate player regardless of actual player card use.

Exemplary anonymous player account profile 192A can contain a variety of information regarding the player. Where the player name or other information is not known, a simple "unknown" or blank can be used in the appropriate field. Other information can mimic what might be present for a registered player, such as, for example, a customer number, the amount of loyalty points, and the current player status or level. One or more biometric files that have been associated with a particular player can also be included in a player profile, as shown. As additional biometrics are detected and can be attributed to a given player, registered or anonymous, such further biometrics can be added to a player profile. In some embodiments, up to ten different fingerprints can be included in a single player profile. In addition to such fingerprint data, other biometrics in the same profile can include retinal scans, vein detection, facial recognition, voice recognition, handwriting analysis, keyboard or other input styles and tendencies, eye pattern movements and/or mobile device identifiers.

Various possible examples of anonymous player tracking details in association with uncarded or otherwise undocumented gaming activity will now be discussed. In some instances, a player tracking server 170 or other suitable system component can be configured to determine whether there is any biometric information detected at or near a gaming machine or the location of unattributed gaming or other pertinent activity by an anonymous customer. Again, such "biometric" information can include the presence of an identifiable mobile device on the anonymous player or customer. The system may determine that wireless signal information and/or other biometric information are close enough to the location of the activity to uniquely identify the activity and associate the detected information with the activity. A comparison of the detected biometric and/or wireless identifier information can then be made against what is already on the database 190.

If an existing player tracking account or profile on database 190 includes the wireless identifier information and/or biometric information associated with the activity, then the activity can be assigned and credited to the existing customer account, regardless of whether the activity is carded or anonymous. Conversely, if the detected information associated with the activity cannot be matched to any existing player tracking customer account or profile, but the detected information and activity meets the criterion for establishing a new virtual customer and corresponding player tracking account, then a new anonymous player tracking account or profile can be created and the activity can be added to the newly created profile.

When multiple biometrics and/or wireless signal sources are located near an anonymous activity, then various factors can be used to determine whether a source is to be associated with an activity, such as a relative distance of the location of the source to the activity relative to the location of the activity. If the source location is considered too far away (e.g., more than arms length or a few feet from an activity location), then the source might not be associated with the activity. This distance can be referred to as a threshold distance. For instance, a given wireless signal source may be determined to beyond an appropriate threshold distance from a gaming or other activity location such that it is not considered associated with the activity. In another example, a given biometric detection, such as a facial recognition, may be determined to be too far away from the given gaming or other activity location for it to be associated with the activity.

If a given biometric and/or wireless signal source is determined to be within an acceptable threshold distance from an activity location, however, then information from the single source can be associated with the activity. For instance, the biometric source location can be a fingerprint detected on an input button, and as such is determined within the acceptable threshold distance associated from the relevant activity location. Thus, the fingerprint information can be associated with the activity at the gaming machine or other relevant location, and can be appropriately recorded in the database. In another example, a wireless device signal source can be within an acceptable threshold distance associated from a gaming machine or other activity location, and thus information from that source can be associated with the activity at that location and recorded in the database.

In some embodiments, an activity can be detected at a gaming machine or other location where neither biometric nor a wireless signal source is detected. In such instances, the system may not have enough information to uniquely identify the anonymous player or customer, such that the attribution to an existing anonymous player tracking account or the creation of a new anonymous player tracking account to associate with the activity is warranted.

In various embodiments, a confidence level can be associated with matching anonymous gaming or other pertinent activities with detected biometrics and/or wireless device data sets. Such confidence levels can be adjusted over time, and can rise or fall based on a number of factors. For example, multiple matching fingerprints or biometrics for a single player can result in a higher confidence level that a particular anonymous player is actually the player that the system suspects him or her to be. Other factors favoring higher confidence levels with a player to stored profile associating can include repeated biometric readings, short periods of time since the last reading, an ongoing gaming session, detection of a new biometric in strong association with detecting other known biometrics and a detected continuous presence of the player at the EGM since the last detection.

For example, if a known biometric finger presses the touch screen and is detected, then an unknown biometric thumb presses the touch screen a second later. The thumb can be tentatively associated with the known player based on the known fingerprint. Again, a confidence level for the new thumb to old finger association can be made. Such a confidence level can be increased over time and repeated instances associated with that player, including across new machines or new gaming sessions. In addition, the use of pressure sensors, IR sensors or other proximity sensors to detect whether the physical presence of player has changed can be implemented. Such sensors can increase the confidence level of associating newly detected biometrics with a known player where the system can tell the same player has remained at the gaming machine or other location of activity.

In addition, such confidence levels can be associated with a given biometric reading within a particular player profile. For example, a first fingerprint stored on anonymous player profile 192A can have a confidence level of 99% where that fingerprint has been associated with that player numerous times in the past, while a second fingerprint stored for player profile 192A can have a confidence level of only 50%, such as where that fingerprint has been detected only once or twice in association with past activities near that player.

Unfortunately, multiple sources of biometric and/or wireless signal data can be located proximate to a given gaming machine or other pertinent activity location. In many such instances, it may not be clear which source can be associated with the activity or whether each of the sources is associated with the same or a different individual. As such, repeated observations by the system can be used in conjunction with a confidence level for each detected biometric. Confidence levels can be associated with each biometric as belonging to a particular person, and also separately with each anonymous gaming session as belonging to a particular person. Again, these confidence levels can be adjusted over time as more readings and observations are made. Where a confidence level for a given biometric is sufficiently high, then that biometric can be positively associated with a player. Where a confidence level for identifying a given player having an anonymous gaming session or activity is sufficiently high, then appropriate loyalty points or other credit for that gaming session or activity can be granted to the proper player profile.

In some embodiments where a confidence level is insufficient or is possibly split between two or more possibilities, then the appropriate loyalty points or other form of activity credit can be suitably split among the appropriate player accounts. For instance, where the system identifies a particular gaming session and attributes that gaming session at a 50% confidence level to one player and at a 50% confidence level to another different player, then half of the loyalty points might be given to one player account and the other half might be given to the other player account. In other instances, one account might be given 70% of the appropriate loyalty points for a session. Another account might be given 30% of the points or credit for that session, or no credit balance may be applied at all if 30% is below the threshold at which credit may be awarded for a given establishment. In still other situations, appropriate loyalty points or other suitable credit for a gaming session can be split between three or more different player accounts based on a corresponding confidence level for each.

Again, the confidence level assigned may be adjusted over time based upon subsequent readings or factors. For example, the system might attribute a given anonymous gaming session at a 50% confidence level for one player and a 50% confidence level for another player based upon a repeated reading of one fingerprint that was detected during that session, such as where that fingerprint is significantly similar for the two given players. The system then later notices that one of those two players is positively identified as having another gaming session at the casino later that night, while the other player is otherwise not detected at the casino at all for that entire month. In such instances, that previous anonymous gaming session may then be mostly or entirely attributed to the more likely player.

Methods

Figure 7:
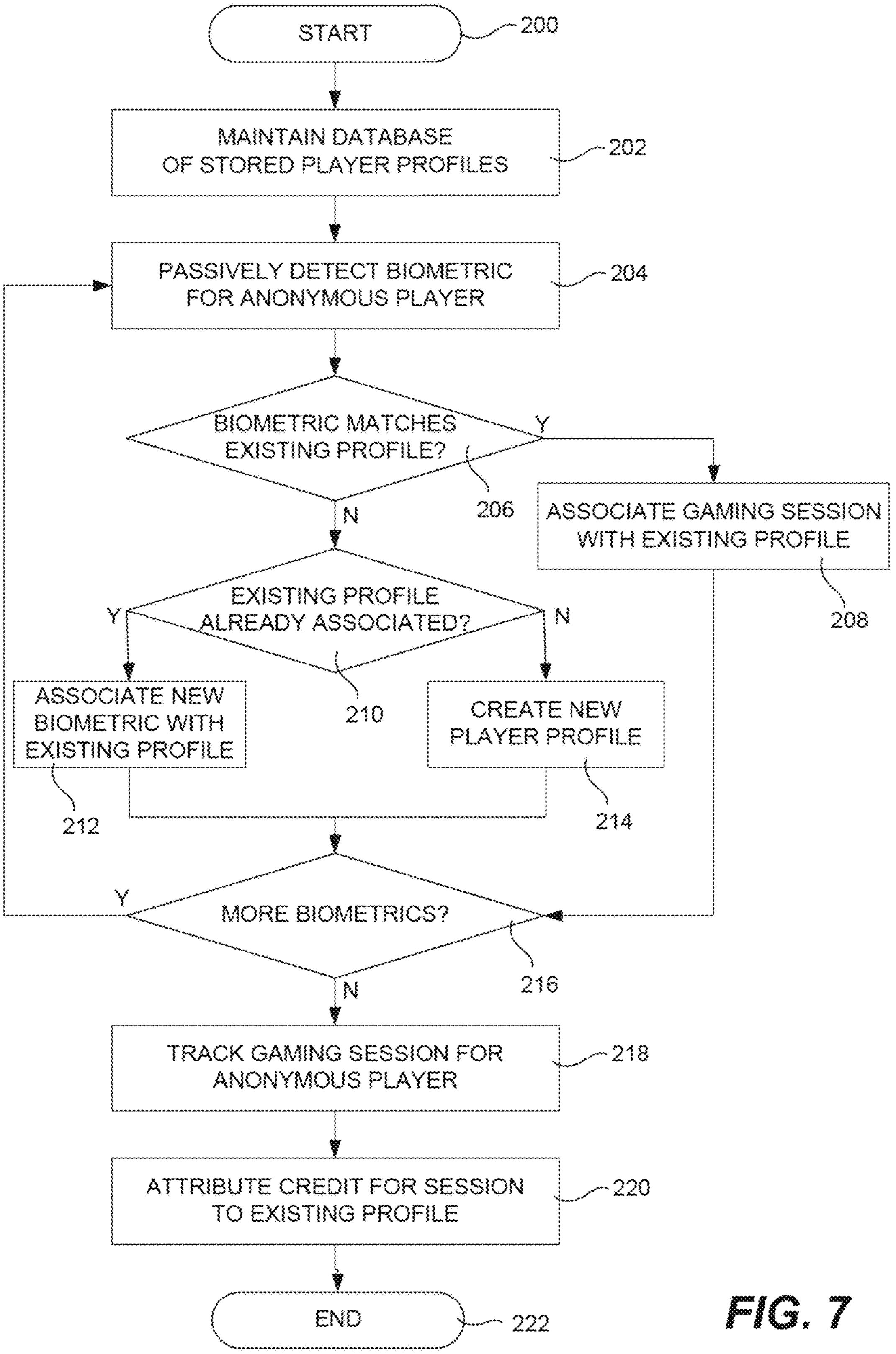
FIG. 7 provides a flowchart of an exemplary method of tracking players anonymously according to one embodiment of the present invention.

FIG. 7 provides a flowchart of an exemplary method of tracking players anonymously according to one embodiment of the present invention. It will be understood that the provided steps are shown only for purposes of illustration, and that many other or different steps may be included in the process, as may be desired. Furthermore, the order of steps may be changed where appropriate and not all steps need be performed in various instances. For example, the order of steps 202 and 204 may be reversed, while step 218 may be performed at several different points in the process. Other differences may also be possible, and it will be readily appreciated that the described steps and order are not limiting in any way.

After a start step 200, an initial process step 202 involves maintaining a database of stored player profiles. Again, step 202 may be performed at different points in the process, and even throughout the entire process. At process step 204, a biometric is passively detected at a gaming machine or other suitable location. At subsequent decision step 206, an inquiry is made as to whether the biometric detected at step 204 matches any biometric of record in an existing profile on the database. If so, then the method continues to process step 208, where the subject anonymous gaming session is associated with the respective existing player profile. As noted above, various confidence levels may also be attributed to such an association. Such details are not included here for purposes of simplicity, although the implementation of such will be readily appreciated.

If the passively detected biometric does not match any existing profile, however, then the method continues to decision step 210, where an inquiry is made as to whether an existing profile has already been associated with the subject player. Such may be the case where the player has already been identified or where previous biometric associations have already been made for that particular player of the anonymous gaming session, for example. If the answer at 210 is yes, then the non-matching new biometric may be associated with the already existing profile at process step 212. In the event of a first detected biometric that is not matched or a subsequent detected biometric with none yet being matched to an existing profile, however, then the answer at 210 is no. The method then moves to process step 214, where a new player profile is created for the anonymous player.

After any of process steps 208, 212, or 214, the method then continues to decision step 216, where an inquiry is made as to whether more biometrics exist for the player during the anonymous gaming session. If so, then the method reverts to process step 204 to detect such additional biometrics, and the method is then repeated for steps 204 through 216. If all biometrics have been detected, however, then the method continues to process step 218, where details of the actual anonymous gaming session are tracked. Such details can involve wager amounts, types of wagers, wins, losses and any other details that are normally tracked in a traditional player loyalty or tracking system. Credit for the anonymous gaming session can then be attributed to the existing or newly created player profile at process step 220, after which the method ends at end step 222.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming machine comprising:

an exterior housing containing a plurality of internal gaming machine components therein;

a master gaming controller in communication with at least one of said plurality of internal gaming machine components and configured to control one or more aspects of a wager-based game;

at least one wager button supported by the exterior housing and in communication with said master gaming controller, the at least one wager button being configured to receive an input associated with a wager on said wager-based game; and a display device including a touch screen operable as a fingerprint detector, the display device supported by the exterior housing and in communication with at least one of said master gaming controller and a separate player tracking system, the display device configured to display one or more aspects of said wager-based game thereupon, the touch screen operable as the fingerprint detector configured to detect a fingerprint of a finger of a player contacting the touch screen without indicating to the player that the fingerprint is being detected, said detected fingerprint facilitating anonymous tracking of gaming activities of said player without the use of a player tracking instrument for said player, wherein the master gaming controller is configured to transmit data representing said detected fingerprint to the separate player tracking system, which is configured to, after associating the detected fingerprint with an existing player profile stored on a database: (1) determine if a confidence level associated with the detected fingerprint exceeds a designated confidence level, said determination being separate from and in addition to any determination to associate any detected fingerprint with any existing player profile, said confidence level based on at least one earlier detection of said fingerprint; (2) if the confidence level exceeds the designated confidence level, attribute credit for gaming activity of the player to the existing player profile; (3) if the confidence level does not exceed the designated confidence level, not attribute the credit for the gaming activity of the player to the existing player profile based on the detected fingerprint; and (4) upon an occurrence of a confidence level increase event, increase the confidence level associated with said detected fingerprint for use upon a next detection of said fingerprint.

2. The gaming machine of claim 1, wherein said separate player tracking system includes a processor that is located remotely from the gaming machine.

3. The gaming machine of claim 1, wherein said separate player tracking system is configured to retain the detected fingerprint for said player and to use this retained detected fingerprint upon subsequent separate interactions with said player.

4. The gaming machine of claim 3, wherein said separate player tracking system is further configured to maintain an individual profile for said player, and wherein said individual profile includes multiple different biometrics for the player.

5. The gaming machine of claim 4, wherein said separate player tracking system is configured to associate a newly detected and previously unknown fingerprint for a known player and to update the individual profile for said known player to include said newly detected fingerprint.

6. The gaming machine of claim 1, wherein said separate player tracking system is configured to compare a detected fingerprint for a second gaming machine player with a plurality of stored fingerprints, and wherein said separate player tracking system is further configured to associate the second player with a stored individual profile when the detected fingerprint matches a stored fingerprint on that stored individual profile.

7. The gaming machine of claim 6, wherein said separate player tracking system is further configured to determine a confidence level for said association based upon the strength of the match.

8. A method of operating a gaming system including at least one server and a plurality of gaming machines, the method comprising:

maintaining, via the at least one server, a database of stored player profiles that include biometrics of known players;

detecting passively, via at least one anonymous player tracking device of one of the plurality of gaming machines, a first biometric for an anonymous player of said gaming machine;

determining, via the at least one server, whether the first biometric is associated with an existing player profile stored on the database;

tracking, via said gaming machine, information regarding the gaming activity of the anonymous player at said gaming machine;

determining, via the at least one server, if a confidence level associated with the first biometric exceeds a designated confidence level, said determination being separate from and in addition to any determination to associate any detected fingerprint with any existing player profile, said confidence level based on at least one earlier detection of the first biometric;

if the first biometric is associated with an existing player profile stored on the database and the confidence level associated with the first biometric exceeds the designated confidence level, attributing, via the at least one server, credit for the gaming activity of the anonymous player to the existing player profile stored on the database;

if the first biometric is associated with an existing player profile stored on the database and the confidence level associated with the first biometric does not exceed the designated confidence level, not attributing the credit for the gaming activity of the anonymous player to the existing player profile stored on the database based on the first biometric;

upon an occurrence of a confidence level increase event, increasing, via the at least one server, the confidence level associated with the first biometric for use upon a next detection of the first biometric.

9. The method of claim 8, wherein said first biometric is a fingerprint of the anonymous player.

10. The method of claim 8, wherein the anonymous player tracking device includes a fingerprint tracking device that is implemented on a touch screen, an input button, or both.

11. The method of claim 8, further comprising the step of: creating, via the at least one server, a new player profile on the database if the first biometric is not associated with an existing player profile stored on the database.

12. The method of claim 8, further comprising the steps of:

detecting passively, via the at least one anonymous player tracking device of said gaming machine, a second biometric for the anonymous player of said gaming machine;

determining, via the at least one server, whether the second biometric is stored on the existing player profile stored on the database for the anonymous player; and if the second biometric is not stored on the existing player profile stored on the database, recording the second biometric to the existing player profile stored on the database for the anonymous player.

13. The method of claim 12, further comprising the step of: assessing, via the at least one server, a confidence level for the second biometric based at least in part on the first biometric.

14. A player tracking system comprising:

a plurality of gaming machines, each having a master gaming controller configured to control one or more aspects of a wager-based game and an anonymous player tracking device in communication with at least one of the master gaming controller and a separate player tracking server, wherein the anonymous player tracking device is configured to detect biometric information from a plurality of different players that utilize the gaming machine to facilitate the anonymous tracking of gaming activities without the use of player tracking instruments for the plurality of different players;

a database storing a plurality of player profiles that include biometric data previously detected by said plurality of gaming machines; and a remote player tracking server in communication with the plurality of gaming machines and the database, said remote player tracking server including a processor, a memory, and a network interface, wherein the processor is configured to:

(a) receive passively detected biometric data regarding an anonymous player from one of the plurality of gaming machines, (b) receive information regarding gaming activity of the anonymous player from said one of the plurality of gaming machines, (c) determine whether the received biometric data is associated with an existing player profile stored on the database, (d) determine if a confidence level associated with the received biometric data exceeds a designated confidence level, said determination being separate from and in addition to any determination to associate any biometric data with any existing player profile, said confidence level based on at least one earlier detection of said biometric data;

(e) if the received biometric data is associated with an existing player profile stored on the database and the confidence level associated with the biometric data exceeds the designated confidence level, attribute credit for the gaming activity of the anonymous player to the existing player profile;

(f) if the received biometric data is associated with an existing player profile stored on the database and the confidence level associated with the biometric data does not exceed the designated confidence level, not attribute the credit for the gaming activity of the anonymous player to the existing player profile based on the biometric data; and (g) upon an occurrence of a confidence level increase event, increase the confidence level associated with said biometric data for use upon a next detection of said biometric data.

15. The player tracking system of claim 14, wherein the processor is further configured to create a new player profile on the database when it is determined that the received biometric data is not associated with an existing player profile stored on the database.

16. The player tracking system of claim 14, wherein at least some of said player profiles include multiple different biometrics for the same player.

17. The player tracking system of claim 14, wherein the processor is further configured to associate a newly detected and previously unknown biometric with a known player and to update the player profile for said known player to include said newly detected biometric.

* * * * *